(12) United States Patent
Healey et al.

(10) Patent No.: US 9,134,731 B2
(45) Date of Patent: Sep. 15, 2015

(54) LOCALITY ADAPTED COMPUTERIZED ASSISTED OR AUTONOMOUS DRIVING OF VEHICLES

(71) Applicant: INTEL CORPORATION, Santa Clara, CA (US)

(72) Inventors: Jennifer A. Healey, San Jose, CA (US); Alexandra C. Zafiroglu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,299

(22) PCT Filed: Aug. 22, 2013

(86) PCT No.: PCT/US2013/056207
§ 371 (c)(1),
(2) Date: Dec. 10, 2013

(87) PCT Pub. No.: WO2015/026352
PCT Pub. Date: Feb. 26, 2015

(65) Prior Publication Data
US 2015/0057869 A1  Feb. 26, 2015

(51) Int. Cl.
*G01C 22/00* (2006.01)
*G05D 1/00* (2006.01)
*G06K 9/00* (2006.01)
*G08G 1/16* (2006.01)

(52) U.S. Cl.
CPC .......... *G05D 1/0088* (2013.01); *G06K 9/00798* (2013.01); *G06K 9/00825* (2013.01); *G08G 1/167* (2013.01)

(58) Field of Classification Search
CPC  G06K 9/00798; G06K 9/00825; G08G 1/167
USPC ...................... 701/36, 23, 301; 348/E13.074
See application file for complete search history.

(56) References Cited

U.S. PATENT DOCUMENTS 5,034,679 A * 7/1991 Henderson et al. ............. 324/96
5,247,440 A    9/1993 Capurka et al.
6,008,740 A   12/1999 Hokings
6,819,779 B1 * 11/2004 Nichani ........................ 382/104

(Continued)

FOREIGN PATENT DOCUMENTS

WO    WO 2009-088437 A1    7/2009

OTHER PUBLICATIONS

International Search Report and Written Opinion mailed May 21, 2014 for International Application No. PCT/US2013/056207, 13 pages.

*Primary Examiner* — Gertrude Arthur Jeanglaude
(74) *Attorney, Agent, or Firm* — Schwabe, Williamson & Wyatt, P.C.

(57) ABSTRACT

Apparatuses, methods and storage medium associated with computerized assist or autonomous driving of vehicles are disclosed herein. In embodiments, a method may include receiving, by a computing device, a plurality of data associated with vehicles driving at various locations within a locality; and generating, by the computing device, one or more locality specific policies for computerized assisted or autonomous driving of vehicles at the locality, based at least in part on the data associated with vehicles driving at various locations within the locality. Other embodiments may be described and claimed.

23 Claims, 8 Drawing Sheets

(56) References Cited

U.S. PATENT DOCUMENTS

| | | | |
|---|---|---|---|
| 7,639,148 B2 * | 12/2009 | Victor | 340/576 |
| 7,647,180 B2 * | 1/2010 | Breed | 701/301 |
| 2006/0197682 A1 | 9/2006 | Crocker et al. | |
| 2012/0310465 A1 | 12/2012 | Boatright et al. | |

* cited by examiner

Non-transitory computer-readable storage medium
802

Programming Instructions 804
configured to cause a device, in response to execution of the programming instructions, to implement selected elements of Figure 1, and/or practice (aspects of) method of Figures 2 - 6.

Figure 8

ND DRIVING OF VEHICLES

LOCALITY ADAPTED COMPUTERIZED ASSISTED OR AUTONOMOUS DRIVING OF VEHICLES

CROSS REFERENCE TO RELATED APPLICATIONS

The present application is a national phase entry under 35 U.S.C. §371 of International Application No. PCT/US2013/056207, filed Aug. 22, 2013, entitled "LOCALITY ADAPTED COMPUTERIZED ASSISTED OR AUTONOMOUS DRIVING OF VEHICLES", which designated, among the various States, the United States of America. The Specification of the PCT/US2013/056207 Application is hereby incorporated by reference.

TECHNICAL FIELD

The present disclosure relates to the field of computerized assisted or autonomous driving of vehicles, in particular, to apparatuses, methods and storage medium associated with generation and application of locality specific policies to computerized assisted or autonomous driving of vehicles at various localities.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently most computerized assisted or autonomous driving systems are designed to be deployed in the developed economy markets, such as the American, European or Japanese markets, where there are long histories of wide spread use of private motor vehicles and associated large population of experienced drivers, as well as strictly enforced codified traffic laws. These systems tend to mimic an idealized rule, following a risk averse driving style. Introducing computerized assisted or autonomous driving systems that follow standard conservative US driving practices, into emerging or under developed economy markets will likely create chaos in the roads of these emerging or under developed economy markets, since drivers in some of the emerging or underdeveloped economy markets may not adhere to the same driving style. In fact, current computerized assisted or autonomous driving systems, designed with a risk averse driving style may have difficulty navigating some of the most straight forward stop signs in developed markets with large populations of experienced drivers, because these systems tend to fail to nudge the vehicles forward in a manner that is convincing to the other cars when multiple cars are waiting. Further, all streets are not equally safe for road users: public spaces may present more or less risk to car users for personal or property crimes, affecting how drivers use these roads, and maneuver their cars on them.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates an example storage medium with instructions configured to enable an apparatus to practice the present disclosure, in accordance with various embodiments.

DETAILED DESCRIPTION

Figure 1:
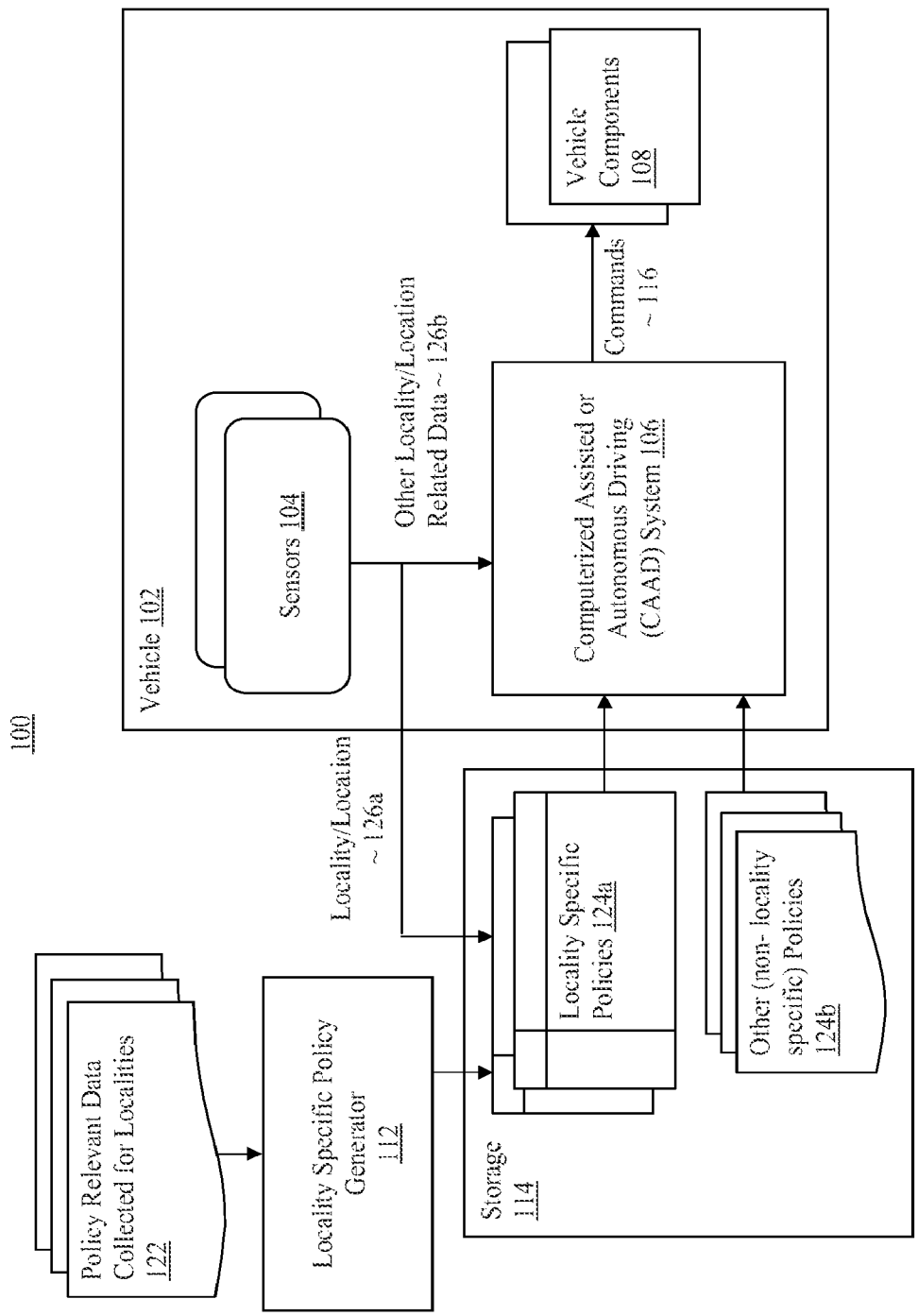
FIG. 1 illustrates a component view of a locality adaptable computerized assisted or autonomous driving arrangement of the present disclosure, in accordance with various embodiments.

Apparatuses, methods and storage medium associated with computerized assisted or autonomous driving of vehicles are disclosed herein. In embodiments, a method may include receiving, by a computing device, a plurality of data associated with vehicles driving at various locations within a locality, e.g., deceleration when approaching stop signs, rolling speed through stop signs, duration of full stop at stop signs, and so forth, within the locality; and generating, by the computing device, one or more locality specific policies for computerized assisted or autonomous driving of vehicles within the locality, e.g., pedestrian, proxemic or aggression policies, based at least in part on the data associated with vehicles driving at various locations within the locality.

The locality specific polices may, e.g., be retrieved and applied to provide computerized assisted or autonomous driving of a vehicle, e.g., responding to a stop sign, turning at an intersection, and so forth, within the specific locality. In embodiments, a method may include first receiving, by a computerized assisted or autonomous driving system of a vehicle, a locality or a current location of the vehicle within the locality; and requesting or retrieving, by the computerized assisted or autonomous driving system, one or more locality specific policies for locality adapted computerized assisted or autonomous driving of vehicles for the locality. The method may further include second receiving, by the computerized assisted or autonomous driving system, a plurality of data associated with policy parameters of the one or more locality specific policies; and assisting or autonomously driving the vehicle, by the computerized assisted or autonomous driving system, within the locality, in a manner that is adapted for the locality, based at least in part on the one or more locality specific policies and the plurality of data associated with policy parameters of the one or more locality specific policies.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1 wherein a component view of a computerized assisted or autonomous driving arrangement of the present disclosure is illustrated, in accordance with various embodiments. As illustrated, computerized assisted or autonomous driving arrangement 100 may include locality specific policy generator 112, storage 114, and computerized assisted or autonomous driving system 106, operatively coupled with each other as shown. As will be described in more detail below, locality specific policy generator 112 may be configured to generate a number of locality specific policies 124a for computerized assisted or autonomous driving of vehicles within various localities. Locality specific policies 124a may take into consideration the local driving practices of the various localities, e.g., whether the local driving practice of a locality is to keep an amount of distance from the vehicle in front, or closely follow the vehicle in front, make a full stop at a stop sign within the locality, or merely roll through the stop sign, or whether the local driving practice of a locality is to honk/nudge the pedestrians as opposed to always yield to the pedestrians. Storage 114 may be configured to store locality specific policies 124a, and to selectively provide the locality specific policies 124a to computerized assisted or autonomous driving system 106, in response to a request from computerized assisted or autonomous driving system 106. Computerized assisted or autonomous driving system 106 may be configured to apply the locality specific policies 124a for a locality in assisting or autonomously driving vehicle 102 within the locality, generating commands 116 accordingly for the various vehicle components 108 while the vehicle is within the locality.

In embodiments, locality specific policy generator 112 may generate locality specific policies 124a for the various localities, based at least in part on policy relevant data 122 respectively collected for the various localities. Examples of these data may include, but are not limited to, whether pedestrians appear to be given absolute, partial or no right-of-ways, whether bicycles appear to be given absolute, partial or no right-of-ways, whether vehicles typically keep an amount of distance or follow each other closely, whether vehicles typically make full stop or roll through stop signs, whether vehicles typically orderly follow first arrive, first depart at stop signs, or they nudge forward, with the most aggressive vehicle getting to go first, pedestrian, bicycle and/or vehicle volumes (at different times in a day, different days of a week, and/or different weeks in a year), road/weather conditions (temperatures, precipitations etc) in different day, week, month or season of a year, crime statistics in different day, week, month or season of a year, and so forth.

In embodiments, some policy relevant data 122 (such as pedestrian, bicycle and/or vehicle volumes, road/weather conditions) may be captured and provided as digital data. Other policy relevant data 122 (such as whether pedestrians/bicycles appear to be given absolute, partial or no right-of-ways) may be captured and provided as images and/or video. Images may be photonic, thermo, sonic, and/or electromagnetic images respectively captured by photo cameras, thermal imaging devices, sonar, and radars. These manners of capturing and providing policy relevant data 122 are meant to be merely illustrative and not limiting.

In embodiments, the various data capturing devices may be incorporated into infrastructures, such as traffic lights, utility poles/towers, and so forth, disposed in vehicles/bicycles passing various locations within the localities, carried by pedestrians passing various locations within the localities, disposed in aerial and/or space vehicles passing over various locations within the localities, and so forth.

In embodiments, locality specific policy generator 112 may be implemented in hardware and/or software, e.g., software configured to be executed on a computing device.

In embodiments, locality specific policies 124a may include, but are not limited to, locality specific pedestrian policies, locality specific proxemic policies and/or locality specific aggression policies. Locality specific pedestrian policies may specify, e.g., whether pedestrians are to be given absolutely, partial or no right-of-way for various localities. Locality specific proxemic policies may specify, e.g., a typical amount of distance to keep from a vehicle in front. Locality specific aggression policies may specify various aggressive levels for various traffic situations for various localities, e.g., from defensive, to mildly aggressive, or very aggressive. The term "aggression" and its various forms, as used herein, in general, refer, but not necessarily limited to, assertiveness or boldness in driving the vehicle. In other embodiments, other locality specific policies may also be generated, the pedestrian, proxemic and aggression policies described are merely illustrative and not limiting.

Storage 114 may be any one of a number of persistent storage devices known in the art, including, but are not limited to, magnetic, optical, and/or solid state storage devices. In embodiments, storage 114 may be networked storage. In embodiments, storage 114 may be hosted by a networked server. In either case, the networked storage or the networked server may be accessible via one or more wired and/or wireless, local and/or wide-area, private and/or public networks (e.g., the Internet). An example of wired network may include, but is not limited to, Ethernet. Wireless networks may include, but are not limited to, WiFi, and/or 3G/4G/5G wireless networks.

In embodiments, storage 114 may also be configured to store other non-locality specific policies 124b that govern selected non-locality specific computerized assisted or autonomous driving issues. An example of non-locality specific policy may include, but is not limited to, a policy that specifies warning a driver to cease driving or autonomously cease driving as soon as possible, when temperature of coolant of a vehicle of a particular vehicle type exceeds a threshold.

In alternate embodiments (not shown), storage 114 may be locally disposed in vehicle 102. In other embodiments (not shown), a smaller version of storage 114 may be locally disposed in vehicle 102 to cache a subset of policies 124a and 124b.

Still referring to FIG. 1, computerized assisted or autonomous driving system 106 may be disposed in vehicle 102, and configured to provide computerized assistance or autonomous driving of vehicle 102, issuing commands 106 to various components 108 of vehicle 102, based at least in part on locality and/or non-locality specific polities 124a and 124b, and locality/location 126a and other locality/location related data 126b. Examples of components 108 may include, but are note limited to, fuel injectors, steering, transmission gears, and brakes, whereas examples of commands 106 may include, but are not limited to, increase/decrease amount of fuel to be injected into the engine of vehicle 102, steer right or left, up shift or down shift gears, apply or cease to apply brake, and so forth. Examples of locality 126a may include, but are not limited to, a continent, a country, a state or province, a county, a city, a township, or a village. Example of location 126a may include, but are not limited to, an intersection, a stop sign, a mile post, an on ramp or a specific global positioning system (GPS) position. Examples of other locality/location related data 126b may include, but are not limited to, date, time of day, current volume of traffic, presence or absence of pedestrian or bicycles, and so forth, of the locality/location.

Computerized assisted or autonomous driving system 106 may be configured to receive locality/location 126a and other locality/location related data 126b from a number of sensors 104, disposed in vehicle 102. In alternate embodiments, some of sensors 104 may be disposed outside vehicle 102. The term "sensor" as used herein is intended to broadly represent all types of data sensing, collecting and/or retrieving components including, but are not limited, GPS receivers configured to receive GPS signal and provide current GPS position of vehicle 102, camera, sonar, and/or radar configured to capture real time images of the surroundings of vehicle 102, and so forth. In embodiments, computerized assisted or autonomous driving system 106 may be configured to derive locality/location 126a and other locality/location related data 126b from data received from sensors 104. For example, computerized assisted or autonomous driving system 106 may be configured to receive a GPS position from a GPS receiver, and derive the locality, e.g., a country or a region, from the GPS position. As a further example, computerized assisted or autonomous driving system 106 may be configured to receive from various imaging devices, real time images of an intersection, and derive a number of pedestrians, bicycles or other vehicles currently present at the intersection.

During operation, computerized assisted or autonomous driving (CAAD) system 106 may first receive/derive a current locality/location 126a of vehicle 102. In response, CAAD system 106 may request (or retrieve), one or more locality specific policies 124a for locality specific computerized assisted or autonomous driving of vehicle 102 for the received/derived locality. Further CAAD system 106 may receive/derive additional data 126b associated with policy parameters of the one or more locality specific policies 124a; and assist or autonomously drive vehicle 102 at the locality, in a manner that is adapted for the locality. CAAD system 106 may assist or autonomously drive vehicle 102 within the locality, based at least in part on the one or more locality specific policies 124a and the plurality of other locality/location related data 126b associated with policy parameters of the one or more locality specific policies 124a. As described earlier, in embodiments, CAAD system 106 may also assist or autonomously drive vehicle 102 within the locality, further based on the one or more non-locality specific policies 124b.

Before further describing the locality adapted computerized assisted or autonomous driving of vehicles of the present disclosure, it should be noted while for ease of understanding and completeness, computerized assisted or autonomous driving arrangement 100 has been described including locality specific policy generator 112 disposed outside vehicle 102, storage 114 and sensors 104 disposed outside/inside vehicle 102, and CAAD System 106 disposed inside vehicle 102, the description is not meant to suggest that the various elements 112, 114, 104 and 106 have to be provided by the same entity. It is anticipated that, in embodiments, the various elements may be developed and provided by different entities. For example, CAAD system 106 may be developed by one entity, while the locality specific policies are developed by one or more other entities. CAAD system 106 developed by one entity may selectively preloaded, or download on an as needed basis, the locality specific policies generated by the one or more other entities.

Figure 2:
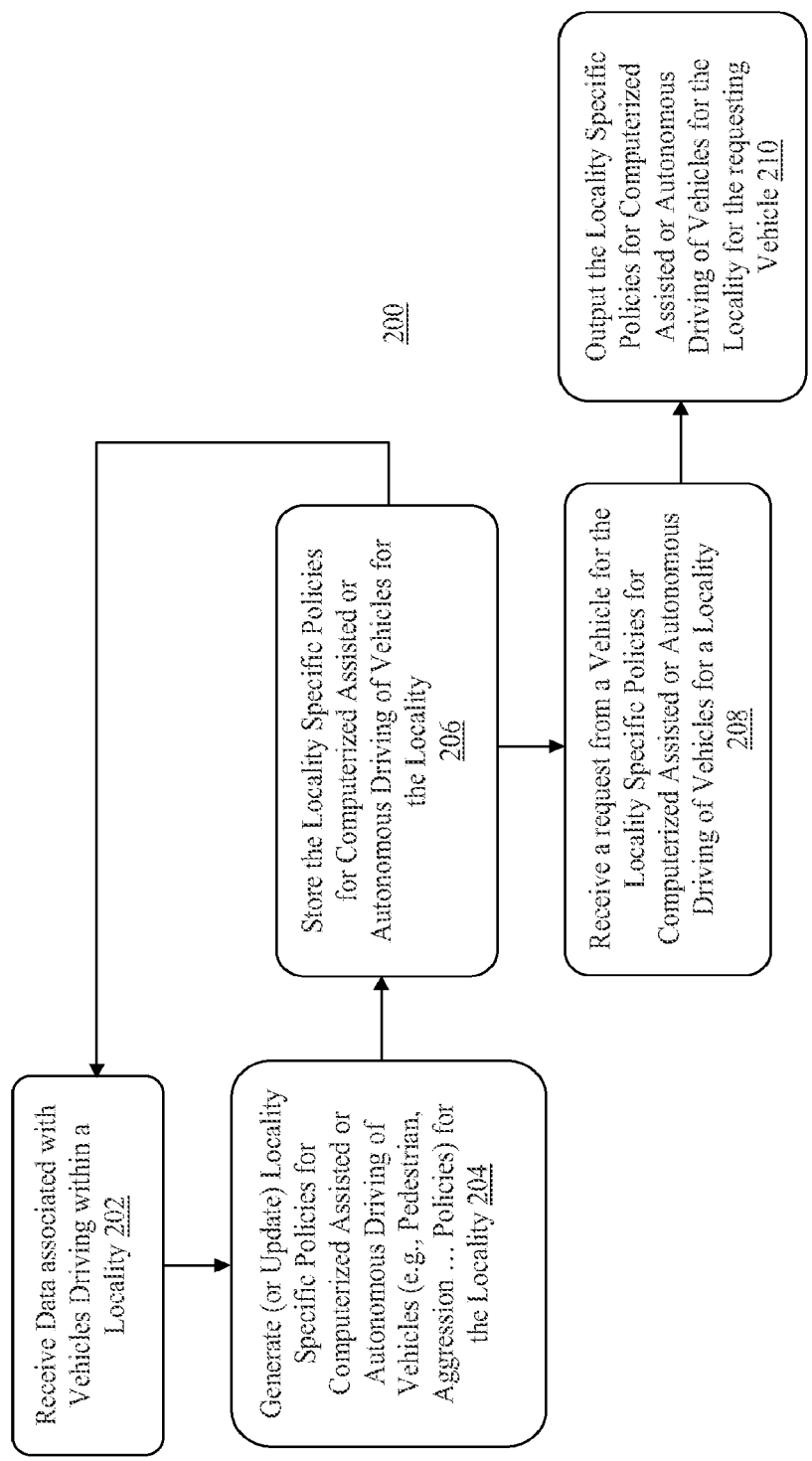
FIG. 2 illustrates a method for generating and providing locality specific computerized assisted or autonomous driving policies, in accordance with various embodiments.

Referring now FIG. 2, wherein a method for generating and providing locality specific computerized assisted or autonomous driving policies is illustrated, in accordance with various embodiments. As shown, method 200 may include operations in blocks 202-210, to be described more fully below. In embodiments, operations of blocks 202-206 may be performed, e.g., by the earlier described locality specific policy generator 112; whereas operations of blocks 208-210 may be performed, e.g., by a networked storage or a networked server having the earlier described storage 114.

As illustrated, method 200 may start at block 202. At block 202, data associated with vehicles driving at various locations within a locality may be received. As described earlier, the data may include a wide range of data, in various forms, collected by various sensors and/or data collection devices.

From block 202, method 200 may proceed to block 204, and then block 206. At block 204, policies, such as pedestrian, proxemics, aggression, and so forth, may be generated for the locality, based at least in part on the wide range of data associated with vehicles driving received for various locations within the locality. At block 206, the generated locality specific policies may be stored, e.g., in a networked storage or a networked server, for subsequent provision to a CAAD system on a vehicle.

From block 206, for the locality, method 200 may proceed to block 208, and then block 210. At block 208, a request for locality specific policies for computerized assisted or autonomous driving of a vehicle may be received for the locality. In response, locality specific policies for computerized assisted or autonomous driving of a vehicle for the locality may be retrieved and returned to the requesting vehicle. The request may be received to preload a CAAD of a vehicle, e.g., at manufacturing or delivery time, or on demand, e.g., when a vehicle is about to enter from one locality to another locality where the localities have different local practices.

Additionally, from block 206, method 200 may proceed back to block 202 to have operations of blocks 202-206 to be performed for another locality. The operations of blocks 202-206 may be repeated as many times as necessary depending on the number of localities with needs for locality specific policies for computerized assisted or autonomous driving of vehicles. Likewise, operations of blocks 202-206 may be repeated as many times as necessary to respond to requests for locality specific policies for computerized assisted or autonomous driving of vehicles for various localities.

Figure 3:
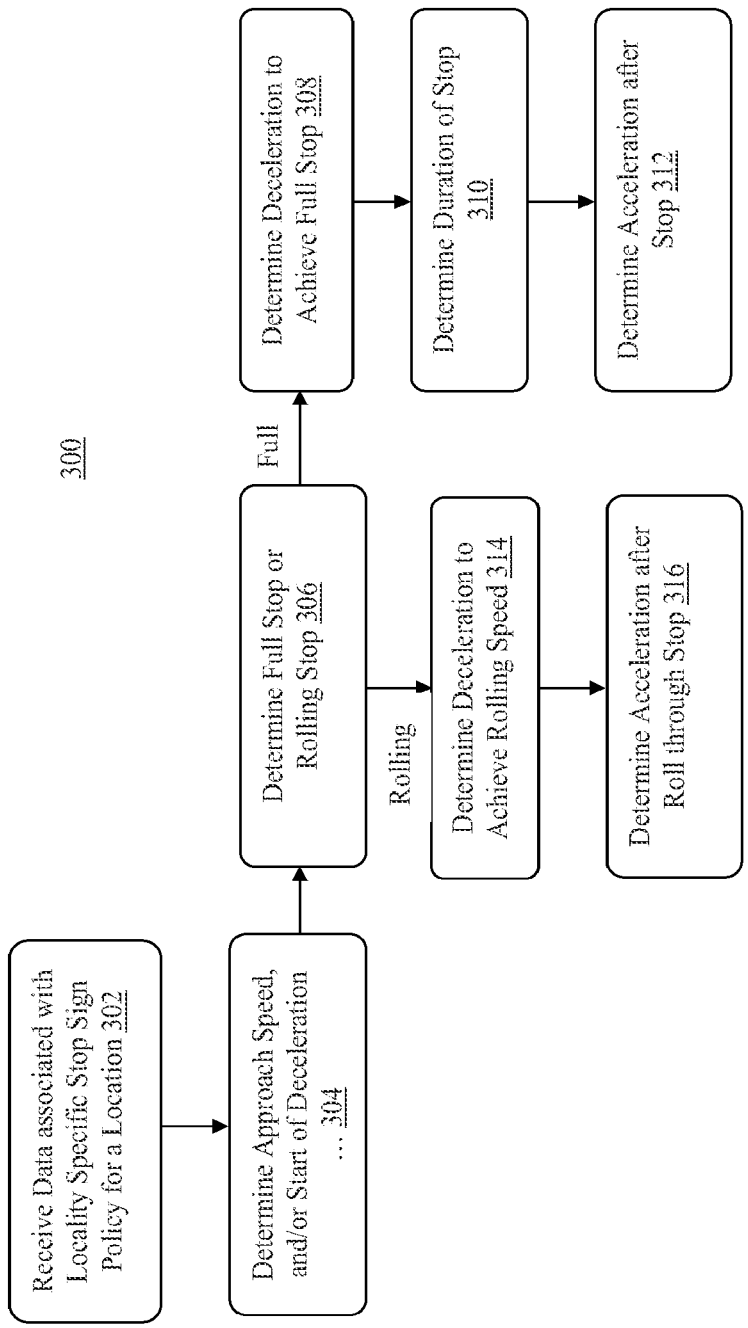
FIG. 3 illustrates an example method for generating a locality specific computerized assisted or autonomous driving policy for responding to a stop sign within a locality, in accordance with various embodiments.

Referring now to FIG. 3, wherein an example method for generating an example locality specific computerized assisted or autonomous driving policy for responding to a stop sign within a locality is illustrated, in accordance with various embodiments. As shown, example method 300 may include operations in blocks 302-316, to be described more fully below. In embodiments, operations of blocks 302-316 may be performed, e.g., by the earlier described locality specific policy generator 112.

As illustrated, method 300 may start at block 302. At block 302, data associated with vehicles driving at various locations within a locality, in particular, data associated with responding to various stop signs within the locality, may be received. As described earlier, the data may include a wide range of data, in various forms, collected by various sensors and/or data collection devices. From block 302, example method 300 may proceed to block 304. At block 304, approach speed, start of deceleration, and so forth may be determined, based at least in part on the data received. For examples, the average, standard deviation or variance of these metrics may be determined.

From block 304, example method 300 may proceed to block 306. At block 306, a determination may be made, based at least in part on the data received, whether the local practice tends to make a full stop at a stop sign or roll through a stop sign.

On determining that the local practice tends to make full stop, example method 300 proceed to blocks 308-312. At block 308, a determination may be made for the deceleration to achieve a full stop, e.g., including the distance from a stop sign to start the deceleration and the deceleration speed. The deceleration may be dependent on vehicle type and the traveling speed of a vehicle. At block 310, a determination may also be made for the typical duration of stop. At block 312, a determination may be made for the acceleration after making the full stop.

On determining that the local practice tends to make a rolling stop, example method 300 may proceed to blocks 314-316. At block 314, a determination may be made for the deceleration to achieve the rolling speed, e.g., including the distance from a stop sign to start the deceleration and the deceleration speed. The deceleration may likewise be dependent on vehicle type and the traveling speed of a vehicle. At block 316, a determination may be made for acceleration after rolling through the stop sign.

Figure 4:
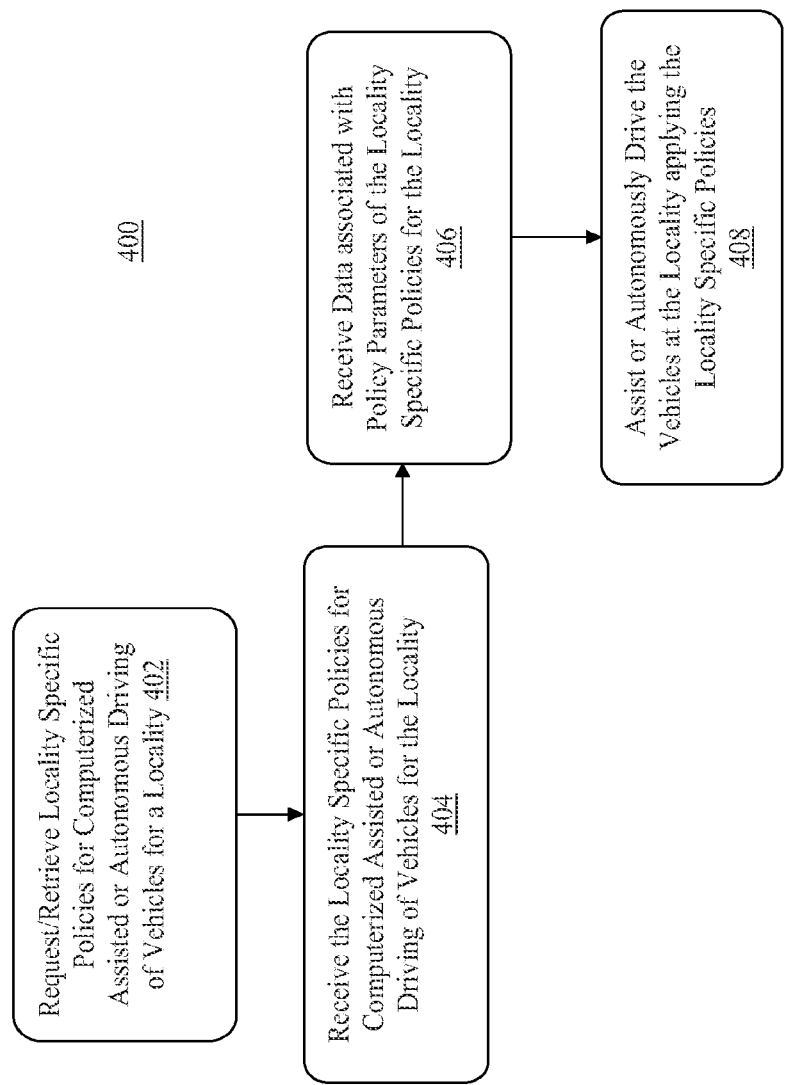
FIG. 4 illustrates a method for applying locality specific computerized assisted or autonomous driving policies to driving vehicles at various localities, in accordance with various embodiments.

Referring now to FIG. 4 wherein a method for applying locality specific computerized assisted or autonomous driving policies for driving vehicles at various locations within a locality is shown, in accordance with various embodiments. As shown, method 400 may include operations in blocks 402-408, to be described more fully below. In embodiments, operations of blocks 402-408 may be performed, e.g., by the earlier described CAAD system 106.

As illustrated, method 400 may start at block 402. At block 402, a request may be made for locality specific policies for computerized assisted or autonomous driving of a vehicle within a locality. As described earlier, the request may be made of a networked storage or a networked server with the locality specific policies. The request may be made in advance or in real time, on an as needed basis. For embodiments, where at least some of the locality specific policies may be locally stored, the request may be made of the local storage.

From block 402, method 400 may proceed to blocks 404 and 406. At block 404, in due course, after the request has been made, the requested locality specific policies may be received. At block 406, data associated with policy parameters of the locality specific policies for the locality may be received.

From block 406, method 400 may proceed to block 408. At block 408, on receipt of the locality specific policies, and the data associated with the applicable locality specific policies, the vehicle may be autonomously driven within the locality, or provided with assistance to do so, applying the received data for the locality to the received/retrieved locality specific policies.

Figure 5:
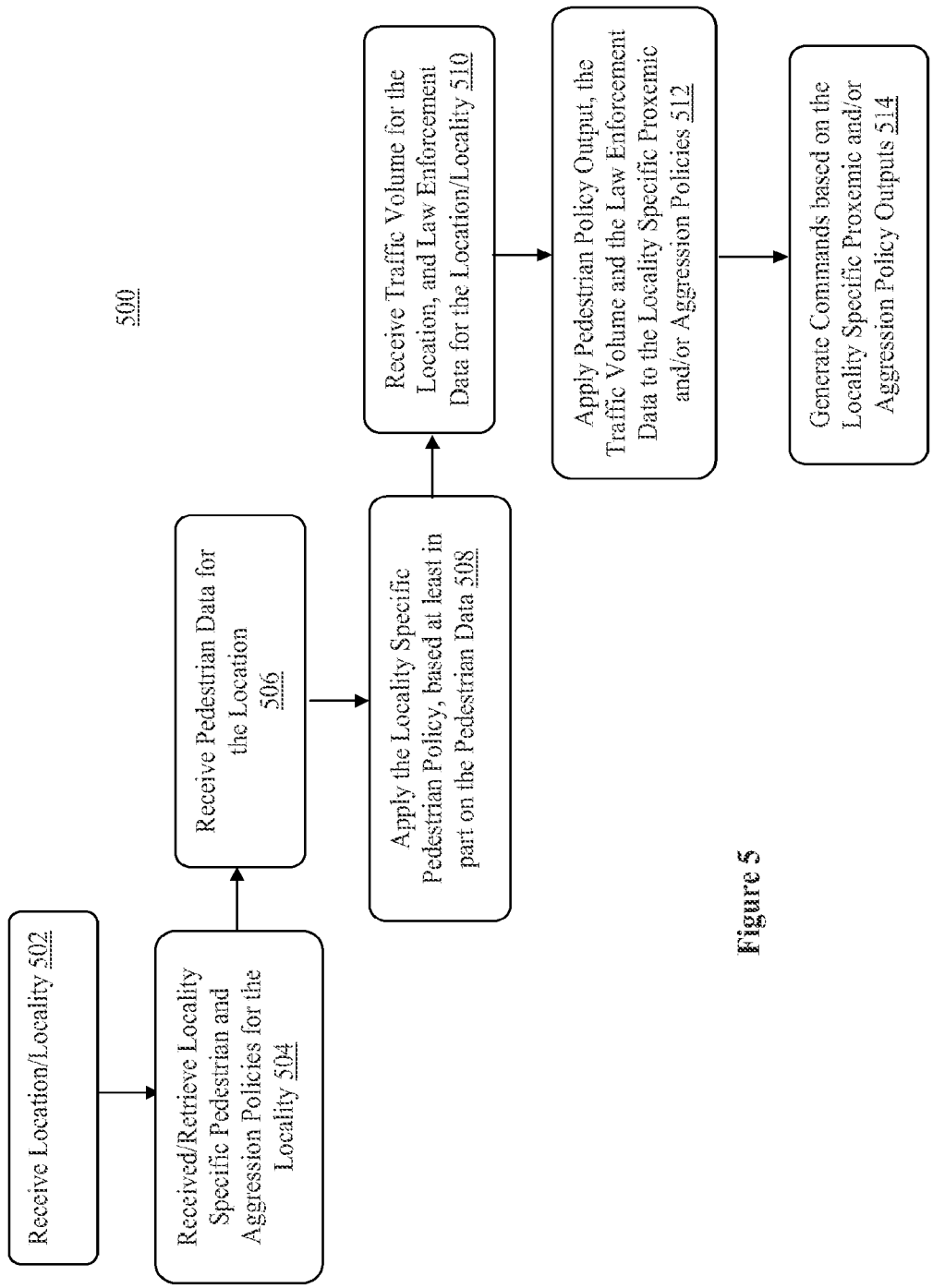
FIG. 5 illustrates an example method for applying locality specific computerized assisted or autonomous driving policies to turning a vehicle at an intersection in a particular locality, in accordance with various embodiments.

Referring now to FIG. 5, wherein an example method for applying example locality specific computerized assisted or autonomous driving policies to turning a vehicle at an intersection within a specific locality, in accordance with various embodiments. As shown, example method 500 may include operations in blocks 502-514, to be described more fully below. In embodiments, operations of blocks 502-514 may be performed, e.g., by the earlier described computerized assisted or autonomous driving system 106.

As illustrated, example method may start at block 502. At block 502, a locality or a location within a locality where the vehicle is currently or will be driven, may be received, e.g., the GPS coordinates of the location or the locality derived based on the GPS coordinates. From block 502, example method 500 may proceed to block 504. At block 504, locality specific policies may be received or retrieved for the locality.

From block 504, example method 500 may proceed to blocks 506-508. At block 506, pedestrian data for the locality contemporaneous with the vehicle driving through the locality may be received. At block 508, the locality specific pedestrian policy may be applied to generate pedestrian policy output, using the received contemporaneous pedestrian data. The pedestrian policy output may specify the vehicle is to yield to the pedestrians, or the vehicle does not have to yield to the pedestrians.

From block 508, example method 500 may proceed to blocks 510-512. At block 510, other data, such as traffic volume of a location, law enforcement likelihood of a locality/location, and so forth, may be received. The traffic volume data for the location may be contemporaneous with the vehicle driving through the location, while the law enforcement likelihood of the locality/location may be historic. At block 512, the locality specific proxemic and/or aggression policy may be applied to generate proxemic and/or aggression policy outputs, using the pedestrian policy output, traffic volume of the location, and law enforcement data of the locality/location. Examples of aggression policy outputs may include, but are not limited to, non-aggressive, mildly aggressive, and/or aggressive. An example of a proxemic policy output may be an amount of distance to maintain from the vehicle in front.

From block 512, example method may proceed to block 514. At block 514, various commands may be issued to various components of the vehicle, based on the proxemic and/or aggression policy outputs, to autonomously drive or provide assistance to driving the vehicle within the locality. As described earlier, the various components may be include fuel injector, steering, transmission gears, brakes, and so forth, whereas examples of commands 106 may include, but are not limited to, increase/decrease amount of fuel to be injected into the engine of vehicle 102, steer right or left, up shift or down shift gears, apply or cease to apply brake, and so forth.

Figure 6:
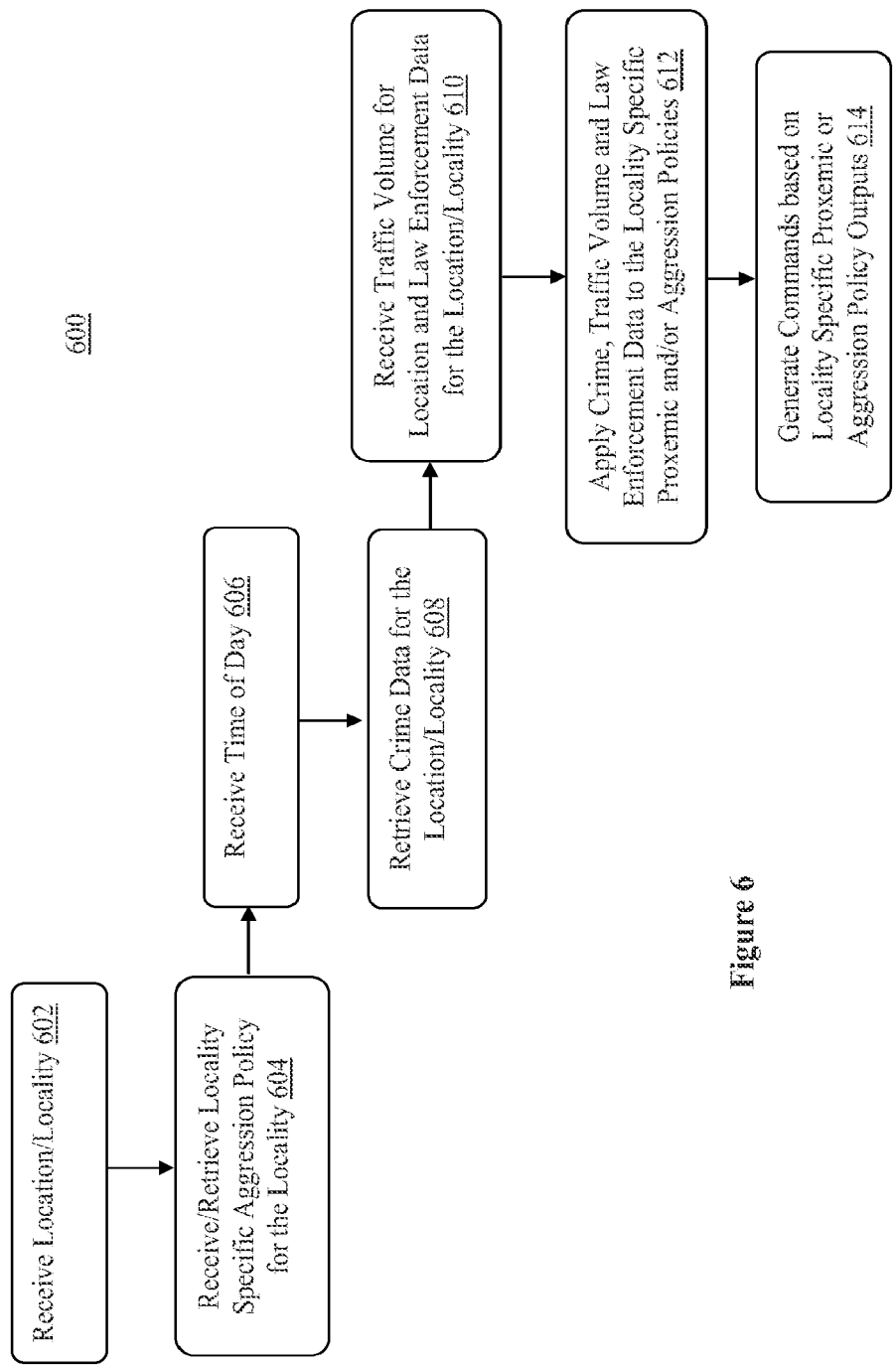
FIG. 6 illustrates an example method for applying locality specific computerized assisted or autonomous driving policies to responding to a stop sign in a particular locality, in accordance with various embodiments.

Referring to FIG. 6, wherein an example method for applying an example locality specific computerized assisted or autonomous driving policies to responding to a stop sign within a particular locality, in accordance with various embodiments. As shown, method 600 may include operations in blocks 602-608, to be described more fully below. In embodiments, operations of blocks 602-608 may be performed, e.g., by the earlier described CAAD system 106.

As illustrated, example method 600 may start at block 602. At block 602, a locality or a location where the vehicle is currently or will be driven, may be received, e.g., the GPS coordinates of the location or a locality derived based on the GPS coordinates. From block 602, example method 600 may proceed to block 604. At block 604, locality specific policies may be received or retrieved for the locality.

From block 604, example method 600 may proceed to blocks 606-608. At block 506, time data for the locality contemporaneous with the vehicle driving through the locality may be received. At block 608, crime data for the location/locality may be retrieved, based on the time of day received.

From block 608, example method 600 may proceed to blocks 610-612. At block 610, other data, such as traffic volume of the location, law enforcement likelihood of the location/locality, and so forth, may be retrieved. The traffic volume data for the location may be contemporaneous with the vehicle driving through the location, while the law enforcement likelihood for the locality/location may be historic. At block 612, the locality specific proxemic or aggression policy may be applied to generate proxemic or aggression policy outputs, using the pedestrian policy output, traffic volume of the location, and law enforcement data of the locality/location. Examples of aggression policy outputs, as described earlier, may include, but are not limited to, non-aggressive, mildly aggressive, and/or aggressive. An example of a proxemic policy output may be an amount of distance to maintain from the vehicle in front.

From block 612, example method may proceed to block 614. At block 614, various commands may be issued to various components of the vehicle, based on the proxemic and/or aggression policy outputs, to autonomously drive or provide assistance to driving the vehicle within the locality. As described earlier, the various components may be include fuel injector, steering, transmission gears, brakes, and so forth, whereas examples of commands 116 may include, but are not limited to, increase/decrease amount of fuel to be injected into the engine of vehicle 102, steer right or left, up shift or down shift gears, apply or cease to apply brake, and so forth.

Figure 7:
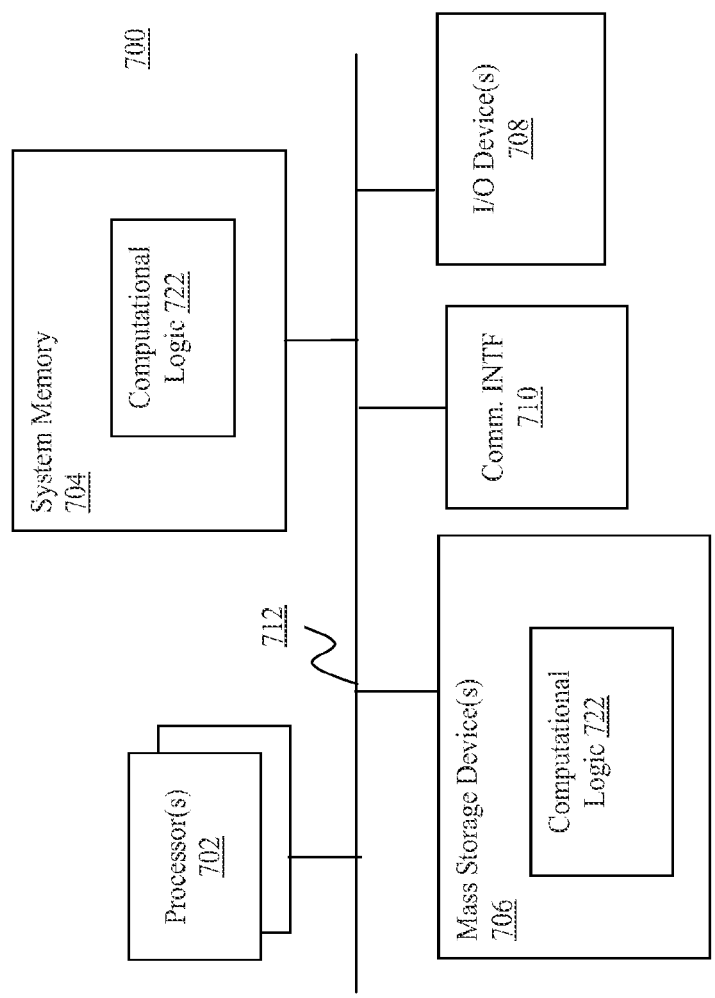
FIG. 7 illustrates an example computing environment suitable for practicing the disclosure, in accordance with various embodiments.

Referring now to FIG. 7, wherein an example computer suitable for use for the arrangement of FIG. 1, in accordance with various embodiments, is illustrated. As shown, computer 700 may include one or more processors or processor cores 702, and system memory 704. In embodiments, multiples processor cores 702 may be disposed on one die. For the purpose of this application, including the claims, the terms "processor" and "processor cores" may be considered synonymous, unless the context clearly requires otherwise. Additionally, computer 700 may include mass storage device(s) 706 (such as diskette, hard drive, compact disc read only memory (CD-ROM) and so forth), input/output device(s) 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the programming instructions implementing the operations associated with locality specific policy generator 112 and/or computerized assisted or autonomous driving system 106, earlier described. The various elements may be implemented by assembler instructions supported by processor(s) 702 or high-level languages, such as, for example, C, that can be compiled into such instructions.

The permanent copy of the programming instructions may be placed into permanent mass storage device(s) 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on the intended use of example computer 700, e.g., whether example computer 700 is a stationary computing device like a set-top box or a desktop computer, or a mobile computing device, like a smartphone, tablet, ultabook or laptop. The constitutions of these elements 710-712 are otherwise known, and accordingly will not be further described.

FIG. 8 illustrates an example non-transitory computer-readable storage medium having instructions configured to practice all or selected ones of the operations associated locality specific policy generator 112 and/or computerized assisted or autonomous driving system 106, earlier described, in accordance with various embodiments. As illustrated, non-transitory computer-readable storage medium 802 may include a number of programming instructions 804. Programming instructions 804 may be configured to enable a device, e.g., computer 700, in response to execution of the programming instructions, to perform, e.g., various operations of methods 200, 300, 400, 500 and/or 600 of FIGS. 2-6 respectively. In alternate embodiments, programming instructions 804 may be disposed on multiple non-transitory computer-readable storage media 802 instead.

Referring back to FIG. 7, for one embodiment, at least one of processors 702 may be packaged together with computational logic 722 (in lieu of storing in memory 704 and/or mass storage device 706) configured to practice aspects of the process of FIG. 2. For one embodiment, at least one of processors 702 may be packaged together with computational logic 722 configured to practice aspects of the process of FIG. 2 to form a System in Package (SiP). For one embodiment, at least one of processors 702 may be integrated on the same die with computational logic 722 configured to practice aspects of the process of FIG. 2. For one embodiment, at least one of processors 702 may be packaged together with computational logic 722 configured to practice aspects of the process of FIG. 2 to form a System on Chip (SoC). For at least one embodiment, the SoC may be utilized in, e.g., but not limited to, a computing tablet.

Thus, example embodiments described include, but are not limited to:

Example 1—an apparatus for computerized assisted or autonomous driving of vehicles. The apparatus may include one or more processors, and a policy generator configured to be operated by the one or more processors to receive a plurality of data associated with vehicles driving within a locality; and generate or update one or more locality specific policies for computerized assisted or autonomous driving of vehicles within the locality, based at least in part on the data associated with vehicles driving within the locality.

Example 2 may be example 1, wherein receive comprises receive image, sonic, or electromagnetic data associated with vehicles driving within the locality, from corresponding imaging, sonar, or electromagnetic devices.

Example 3 may be example 1 or 2, wherein receive comprises receive the plurality of data associated with vehicles driving within the locality from devices disposed at various locations within the locality, devices disposed in vehicles passing through various locations within the locality, devices carried by pedestrians passing through various locations within the locality, or devices disposed on aerial or space vehicles passing over various locations within the locality.

Example 4 may be any one of examples 1-3, wherein generate comprises generate a locality specific pedestrian policy for computerized assisted or autonomous driving of vehicles within the locality.

Example 5 may be any one of examples 1-4, wherein generate comprises generate a locality specific aggression policy for computerized assisted or autonomous driving of vehicles within the locality.

Example 6 may be any one of examples 1-5, wherein generate comprises generate a locality specific proxemic policy for computerized assisted or autonomous driving of vehicles within the locality.

Example 7 may be any one of examples 1-6, wherein generate comprises generate a locality specific stop sign policy for computerized assisted or autonomous driving of vehicles in response to a stop sign within the locality.

Example 8 may be any one of examples 1-7, further comprising a storage medium coupled with the policy generator and configured to store the one or more locality specific policies for output to one or more vehicles for locality adapted computerized assisted or autonomous driving of the one or more vehicles within the locality.

Example 9 may be example 8, wherein the storage medium is further configured to selectively output the one or more locality specific policies to a first of the one or more vehicles, in response to receipt, from the first vehicle, a request for a subset of the one or more locality specific policies for the locality.

Example 10 may be an apparatus for computerized assisted or autonomous driving of vehicles. The apparatus may comprise one or more processors; and a computerized assisted or autonomous driving system. The computerized assisted or autonomous driving system may be configured to be operated by the one or more processors to first receive a locality or a current location of the vehicle within the locality; and request or retrieve one or more locality specific policies for locality adapted computerized assisted or autonomous driving of vehicles within the locality. The computerized assisted or autonomous driving system may be configured to be operated by the one or more processors to second receive a plurality of data associated with policy parameters of the one or more locality specific policies; and assist or autonomously drive a vehicle within the locality, in a manner that is adapted for the locality, based at least in part on the one or more locality specific policies and the plurality of data associated with policy parameters of the one or more locality specific policies.

Example 11 may be example 10, wherein first receive comprises receive the current location of the vehicle, from a global position system receiver.

Example 12 may be example 10 or 11, wherein request or retrieve comprises request a remote server for the one or more locality specific policies, and wherein receive comprises receive from the remote server the one or more locality specific policies.

Example 13 may be any one of examples 10-12, further comprising local storage coupled with the computerized assisted or autonomous driving system, and configured to store the one or more locality specific policies, and wherein request or retrieve comprises retrieve, from the local storage, the one or more locality specific policies.

Example 14 may be any one of examples 10-13, wherein the one or more locality specific policies comprise a locality specific pedestrian policy, wherein second receive comprises receive real time images of the current location, and wherein the computerized assisted or autonomous driving system is further configured to process the real time images to determine whether one or more pedestrians are present at the current location.

Example 15 may be any one of examples 10-14, wherein the one or more locality specific policies comprise a locality specific aggression policy, wherein second receive comprises receive traffic volume for the current location or law enforcement data of the current location or locality, wherein the proxemic and aggression policies respectively specify an amount of distance to maintain from a vehicle in front and a level of aggression for computerized assisted or autonomously driving the vehicle, based at least in part on the traffic volume of the current location, or law enforcement data of the current location or locality.

Example 16 may be example 15, wherein the computerized assisted or autonomous driving system is further configured to determine a time of day, wherein the second receive further comprises receive crime data of the current location or locality for the time of day, wherein the proxemic and the aggression policy respectively specify the distance and the level of aggression, further based on crime data of the current location or locality.

Example 17 may be any one of examples 10-16, wherein the one or more locality specific policies comprise a locality specific proxemic or aggression policy, wherein assist or autonomously drive the vehicle comprises application of the locality specific proxemic or aggression policy to computerized assisted or autonomous driving of the vehicle at various locations within the locality.

Example 18 may be example 17, wherein the one or more locality specific policies further comprise a locality specific pedestrian policy, and the proxemic and aggression policies respectively specify an amount of distance to maintain from a vehicle in front or a level of aggression based at least in part on an output from an application of the locality specific pedestrian policy, and wherein assist or autonomously drive the vehicle, further comprises application of the locality specific pedestrian policy prior to application of the locality specific proxemic or aggression policy.

Example 19 may be a method for computerized assisted or autonomous driving of vehicles. The method may comprise receiving, by a computing device, a plurality of data associated with vehicles driving at various locations within a locality; and generating or updating, by the computing device, one or more locality specific policies for computerized assisted or autonomous driving of vehicles within the locality, based at least in part on the data associated with vehicles driving within the locality.

Example 20 may be example 19, wherein receiving comprises receiving image, sonic, or electromagnetic data associated with vehicles driving within the locality, from corresponding imaging, sonar, or electromagnetic devices.

Example 21 may be example 19 or 20, wherein receiving comprises receiving the plurality of data associated with vehicles driving within the locality from devices disposed at various locations within the locality, devices disposed in vehicles passing through various locations within the locality, devices carried by pedestrians passing through various locations within the locality, or devices disposed on aerial or space vehicles passing over various locations within the locality.

Example 22 may be any one of examples 19-21, wherein generating comprises generating a locality specific pedestrian policy for computerized assisted or autonomous driving of vehicles within the locality.

Example 23 may be any one of examples 19-22, wherein generating comprises generating a locality specific proxemic or aggression policy for computerized assisted or autonomous driving of vehicles within the locality.

Example 24 may be example 23, wherein generating a locality specific aggression policy comprises generating a locality specific aggression policy for computerized assisted or autonomous driving of vehicles in response to a stop sign within the locality, specifying whether to make a rolling or full stop at a stop sign within the locality.

Example 25 may be example 23, wherein generating a locality specific aggression policy for computerized assisted or autonomous driving of vehicles in response to a stop sign within the locality, specifying whether to make a rolling or full stop at a stop sign within the locality, comprises determining deceleration and rolling speed for a rolling stop, or deceleration and duration of a full stop.

Example 26 may be any one of examples 19-25, wherein the computing device comprises a first computing device, and wherein the method further comprises outputting, by a second computing device, the one or more locality specific policies to one or more vehicles for locality adapted computerized assisted or autonomous driving of the one or more vehicles within the locality.

Example 27 may be example 26, wherein outputting comprises transmitting, by the second computing device, the one or more locality specific policies to a first of the one or more vehicles, in response to receiving, from the first vehicle, a request for the one or more locality specific policies for the locality.

Example 28 may be any one of examples 19-27, further comprising receiving, by a computerized assisted or autonomous driving system of a first of the one or more vehicles, the one or more locality specific policies for locality adapted computerized assisted or autonomous driving of vehicles; and assisted or autonomously driving the first of the one or more vehicles, by the computerized assisted or autonomous driving system, within the locality, in a manner that is adapted for the locality, based at least in part on the one or more locality specific policies.

Example 29 may be example 28, wherein the computing device comprises a first computing device, wherein the method further comprises requesting a second computing device, by the computerized assisted or autonomous driving system of the first vehicle, for the one or more locality specific policies, and wherein receiving by a computerized assisted or autonomous driving system of a first of the one or more vehicles comprises receiving from the second computing device, by the computerized assisted or autonomous driving system of the first vehicle, the one or more locality specific policies.

Example 30 may be a method for computerized assisted or autonomous driving of vehicles. The method may comprise first receiving, by a computerized assisted or autonomous driving system of a vehicle, a locality or a current location of the vehicle within the locality; and requesting or retrieving, by the computerized assisted or autonomous driving system, one or more locality specific policies for locality adapted computerized assisted or autonomous driving of vehicles within the locality. The method may further comprise second receiving, by the computerized assisted or autonomous driving system, a plurality of data associated with policy parameters of the one or more locality specific policies; and assisted or autonomously driving the vehicle, by the computerized assisted or autonomous driving system, within the locality, in a manner that is adapted for the locality, based at least in part on the one or more locality specific policies and the plurality of data associated with policy parameters of the one or more locality specific policies.

Example 31 may be example 30, wherein first receiving comprises receiving by the computerized assisted or autonomous driving system, the current location of the vehicle, from a global position system receiver.

Example 32 may be example 30 or 31, wherein requesting or retrieving comprises requesting a remote server, by the computerized assisted or autonomous driving system, for the one or more locality specific policies, and wherein receiving by a computerized assisted or autonomous driving system of a vehicle comprises receiving from the remote server, by the computerized assisted or autonomous driving system, the one or more locality specific policies.

Example 33 may be any one of examples 30-32, wherein requesting or retrieving comprises retrieving, by the computerized assisted or autonomous driving system, from a local storage of the vehicle, the one or more locality specific policies.

Example 34 may be any one of examples 30-33, wherein the one or more locality specific policies comprise a locality specific pedestrian policy, wherein second receiving comprises receiving, by the computerized assisted or autonomous driving system, real time images of the current location, and wherein the method further comprises processing the real time images, by the computerized assisted or autonomous driving system, to determine whether one or more pedestrians are present at the current location.

Example 35 may be any one of examples 30-34, wherein the one or more locality specific policies comprise a locality specific proxemic or aggression policy, wherein second receiving comprises receiving, by the computerized assisted or autonomous driving system, traffic volume for the current location or law enforcement data of the current location or locality, wherein the proxemic and aggression policies respectively specify an amount of distance to maintain from a vehicle in front and a level of aggression for computerized assisted or autonomously driving the vehicle, based at least in part on the traffic volume of the current location, or law enforcement data of the current location or locality.

Example 36 may be example 35, wherein the method further comprises determining a time of day, wherein the second receiving further comprises receiving, by the computerized assisted or autonomous driving system, crime data of the current location or locality for the time of day, wherein the proxemic and the aggression policy respectively specify the distance and the level of aggression, further based on crime data of the current location or locality.

Example 37 may be any one of examples 30-36, wherein the one or more locality specific policies comprise a locality specific proxemic or aggression policy, wherein assisted driving or autonomously driving the vehicle, by the computerized assisted or autonomous driving system, within the locality, comprises applying the locality specific proxemic or aggression policy to computerized assisted or autonomous driving of the vehicle at various locations within the locality.

Example 38 may be example 37, wherein the one or more locality specific policies further comprise a locality specific pedestrian policy, and the proxemic and aggression policies respectively specify an amount of distance to maintain from a vehicle in front or a level of aggression based at least in part on an output from an application of the locality specific pedestrian policy, and wherein assisted driving or autonomously driving the vehicle, further comprises applying the locality specific pedestrian policy prior to applying the locality specific proxemic or aggression policy.

Example 39 may be one or more storage medium comprising a plurality of instructions configured to cause a computing device, in response to execution of the instructions by the computing device, to perform one of the methods of examples 19-27.

Example 40 may be one or more storage medium comprising a plurality of instructions configured to cause a computerized assisted or autonomous driving system, in response to execution of the instructions by the computerized assisted or autonomous driving system, to perform one of the methods of examples 30-38.

Example 41 may be an apparatus for computerized assisted or autonomous driving of vehicles, comprising means for performing one of the methods of examples 19-27.

Example 42 may be an apparatus for computerized assisted or autonomous driving of vehicles, comprising means for performing one of the methods of examples 30-38.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computerized assisted or autonomous driving of vehicles, comprising:
   one or more processors;
   a policy generator to be operated by the one or more processors to:
      receive a plurality of data associated with a first plurality of vehicles driving within a locality; and
      generate or update one or more locality specific policies for computerized assisted or autonomous driving of second one or more vehicles within the locality, based at least in part on the data associated with the first plurality of vehicles driving within the locality; and
   a storage medium coupled with the policy generator to store the one or more locality specific policies, and to selectively output the one or more locality specific policies to a computerized assisted or autonomous driving system of a first of the second one or more vehicles, in response to receipt, from the first vehicle, a request for a subset of the one or more locality specific policies for the locality;
   wherein the computerized assisted or autonomous driving system of the first vehicle assists or autonomously drives the first vehicle within the locality, in a manner that is adapted for the locality, based at least in part on the one or more locality specific policies and data associated with policy parameters of the one or more locality specific policies.

2. The apparatus of claim 1, wherein the policy generator to receive of a plurality of data comprises the policy generator to receive image, sonic, or electromagnetic data associated with the first plurality of vehicles driving within the locality, from corresponding imaging, sonar, or electromagnetic devices.

3. The apparatus of claim 1, wherein the policy generator to receive of a plurality of data comprises the policy generator to receive the plurality of data associated with the first plurality of vehicles driving within the locality from devices disposed at various locations within the locality, devices disposed in vehicles passing through various locations within the locality, devices carried by pedestrians passing through various locations within the locality, or devices disposed on aerial or space vehicles passing over various locations within the locality.

4. The apparatus of claim 1, wherein the policy generator to generate or update one or more locality specific policies comprises the policy generator to generate a locality specific pedestrian policy for computerized assisted or autonomous driving of the second one or more vehicles within the locality.

5. The apparatus of claim 1, wherein the policy generator to generate or update one or more locality specific policies comprises the policy generator to generate a locality specific aggression policy for computerized assisted or autonomous driving of the second one or more vehicles within the locality.

6. The apparatus of claim 1, wherein the policy generator to generate or update one or more locality specific policies comprises the policy generator to generate a locality specific proxemic policy for computerized assisted or autonomous driving of the second one or more vehicles within the locality.

7. The apparatus of claim 1, wherein the policy generator to generate or update one or more locality specific policies comprises the policy generator to generate a locality specific stop sign policy for computerized assisted or autonomous driving of the second one or more vehicles in response to a stop sign within the locality.

8. An apparatus for on-board computerized assisted or autonomous driving of vehicles, comprising:
   one or more processors disposed on a vehicle; and
   a computerized assisted or autonomous driving system to be operated by the one or more processors to:
      first receive a locality or a current location of the vehicle within the locality;
      request or retrieve one or more locality specific policies for locality adapted computerized assisted or autonomous driving of vehicles within the locality;
      second receive a plurality of data associated with policy parameters of the one or more locality specific policies; and
      assist or autonomously drive the vehicle within the locality, in a manner that is adapted for the locality, based at least in part on the one or more locality specific policies and the plurality of data associated with policy parameters of the one or more locality specific policies.

9. The apparatus of claim 8, wherein the computerized assisted or autonomous driving system to first receive comprises the computerized assisted or autonomous driving system to receive the current location of the vehicle, from a global position system receiver, while the vehicle is in operation.

10. The apparatus of claim 8, wherein the computerized assisted or autonomous driving system to request or retrieve comprises the computerized assisted or autonomous driving system to request a remote server for the one or more locality specific policies, and wherein the computerized assisted or autonomous driving system to receive comprises the computerized assisted or autonomous driving system to receive from the remote server the one or more locality specific policies.

11. The apparatus of claim 8, further comprising local storage coupled with the computerized assisted or autonomous driving system, to store the one or more locality specific policies, and wherein the computerized assisted or autonomous driving system to request or retrieve comprises the computerized assisted or autonomous driving system to retrieve, from the local storage, the one or more locality specific policies.

12. The apparatus of claim 8, wherein the one or more locality specific policies comprise a locality specific pedestrian policy, wherein the computerized assisted or autonomous driving system to second receive comprises the computerized assisted or autonomous driving system to receive real time images of the current location, and wherein the computerized assisted or autonomous driving system is further to process the real time images to determine whether one or more pedestrians are currently present at the current location.

13. The apparatus of claim 8, wherein the one or more locality specific policies comprise a locality specific aggression policy, wherein the computerized assisted or autonomous driving system to second receive comprises the computerized assisted or autonomous driving system to receive traffic volume for the current location or law enforcement data of the current location or locality, wherein the proxemic and aggression policies respectively specify an amount of distance to maintain from a vehicle in front and a level of aggression for computerized assisted or autonomously driving the vehicle, based at least in part on the traffic volume of the current location, or law enforcement data of the current location or locality.

14. The apparatus of claim 13, wherein the computerized assisted or autonomous driving system is further to determine a time of day, wherein the computerized assisted or autonomous driving system to second receive further comprises the computerized assisted or autonomous driving system to receive crime data of the current location or locality for the time of day, wherein the proxemic and the aggression policy respectively specify the distance and the level of aggression, further based on crime data of the current location or locality.

15. The apparatus of claim 8, wherein the one or more locality specific policies comprise a locality specific proxemic or aggression policy, wherein the computerized assisted or autonomous driving system to assist or autonomously drive the vehicle comprises the computerized assisted or autonomous driving system to apply of the locality specific proxemic or aggression policy to computer assisted or autonomous driving of the vehicle at various locations within the locality.

16. The apparatus of claim 15, wherein the one or more locality specific policies further comprise a locality specific pedestrian policy, and the proxemic and aggression policies respectively specify an amount of distance to maintain from a vehicle in front or a level of aggression based at least in part on an output from an application of the locality specific pedestrian policy, and wherein the computerized assisted or autonomous driving system to assist or autonomously drive the vehicle, further comprises the computerized assisted or autonomous driving system to apply the locality specific pedestrian policy prior to application of the locality specific proxemic or aggression policy.

17. A method for computerized assisted or autonomous driving of vehicles, comprising:
receiving, by a computing device, a plurality of data associated with a first plurality of vehicles driving at various locations within a locality;
generating or updating, by the computing device, one or more locality specific policies for computerized assisted or autonomous driving of second one or more vehicles within the locality, based at least in part on the data associated with vehicles driving within the locality;
storing the one or more locality specific policies; and
selectively outputting the one or more locality specific policies to a computerized assisted or autonomous driving system of a first of the second one or more vehicles, in response to receipt, from the first vehicle, a request for a subset of the one or more locality specific policies for the locality;
wherein the computerized assisted or autonomous driving system of the first vehicle assists or autonomously drives the first vehicle within the locality, in a manner that is adapted for the locality, based at least in part on the one or more locality specific policies and data associated with policy parameters of the one or more locality specific policies.

18. The method of claim 17, wherein receiving a plurality of data comprises receiving image, sonic, or electromagnetic data associated with the first plurality of vehicles driving within the locality, from corresponding imaging, sonar, or electromagnetic devices.

19. The method of claim 17, wherein generating one or more locality specific policies comprises generating a locality specific pedestrian, proxemic or aggression policy for computerized assisted or autonomous driving of vehicles within the locality.

20. One or more non-transitory computer-readable storage medium having a plurality of instructions, in response to execution of the instructions by a computerized assisted or autonomous driving system of a vehicle, to cause the computerized assisted or autonomous driving system to:
first receive a locality or a current location of the vehicle within the locality;
request or retrieve one or more locality specific policies for locality adapted computerized assisted or autonomous driving of vehicles within the locality;
second receive a plurality of data associated with policy parameters of the one or more locality specific policies; and
assist driving or autonomously drive the vehicle, within the locality, in a manner that is adapted for the locality, based at least in part on the one or more locality specific policies and the plurality of data associated with policy parameters of the one or more locality specific policies.

21. The storage medium of claim 20, wherein to first receive comprises to receive the current location of the vehicle, from a global position system receiver.

22. The storage medium of claim 20, wherein the one or more locality specific policies comprise a locality specific pedestrian policy, wherein to second receive comprises to receive real time images of the current location, and wherein the computerized assisted or autonomous driving system is to further process the real time images, to determine whether one or more pedestrians are currently present at the current location.

23. The storage medium of claim 20, wherein the one or more locality specific policies comprise a locality specific proxemic or aggression policy, wherein to second receive comprises to receive traffic volume for the current location or law enforcement data of the current location or locality, wherein the proxemic and aggression policies respectively specify an amount of distance to maintain from a vehicle in front and a level of aggression for computerized assisted or autonomously driving the vehicle, based at least in part on the traffic volume of the current location, or law enforcement data of the current location or locality.

\* \* \* \* \*